United States Patent [19]
Del Rosario

[11] Patent Number: 5,800,022
[45] Date of Patent: Sep. 1, 1998

[54] QUICK RELEASE FASTENER

[75] Inventor: Javier Del Rosario, Perris, Calif.

[73] Assignee: Hartwell Corporation, Placentia, Calif.

[21] Appl. No.: 799,197

[22] Filed: Feb. 13, 1997

[51] Int. Cl.$^6$ ............................................. B60B 37/04
[52] U.S. Cl. ..................... 301/5.3; 301/118; 280/11.22; 403/348
[58] Field of Search ..................... 403/348, 349, 403/377, 381, DIG. 4; 301/5.3, 5.7, 111, 112, 118, 119, 120, 121, 122; 280/11.19, 11.22, 11.23

[56] References Cited

U.S. PATENT DOCUMENTS

| | | | |
|---|---|---|---|
| 661,255 | 11/1900 | Belfield | 301/118 |
| 884,196 | 4/1908 | McTigue | 301/118 |
| 2,379,984 | 7/1945 | Nereaux | 403/348 X |
| 5,190,301 | 3/1993 | Malewicz | 280/11.22 |
| 5,441,286 | 8/1995 | Pozzobon | 280/11.22 X |
| 5,673,925 | 10/1997 | Stewart | 301/111 X |

OTHER PUBLICATIONS

Southco Fasteners Handbook 35–1986 edition, two title pages and pp. B–1,B–2,B–4,B–6,B–7,B–8,B–9.
Machine Design Magazine, Sep. 11, 1986 – p. 54.
New Equipment Digest, Jun. 1985–ad for a Dzus fastener.
Machine Design Magazine, Jun. 12, 1986–p. 91.
Machine Design Magazine, Oct. 9, 1986–p. 78, fastener labeled "¼–Turns Mini Dart".
Machine Design Magazine, Jan. 8, 1987–p. 117, Quick–operating 37F PCB fastener.

*Primary Examiner*—Russell D. Stormer
*Attorney, Agent, or Firm*—Pretty Schroeder & Poplawski

[57] ABSTRACT

A quick release fastener having a pin and a retainer, with the pin having a shaft of a diameter A with a head at one end of the shaft, and having a T-shaped tip at the other end of the shaft, the T-shaped tip having a stem in line with the shaft and opposed transverse arms, with the stem of the tip of a diameter B less than the diameter A, and with the distance across the transverse arms greater than the diameter B, and with the stem of a length C, the retainer having a body with an opening for the tip of the pin, the body having an inner end for passing the tip of the pin and an outer end with transverse notches for receiving the arms of the tip, the body having a ramp adjacent each of the notches, with the length D of the body between the inner end and the ramp not greater than the length C.

10 Claims, 3 Drawing Sheets

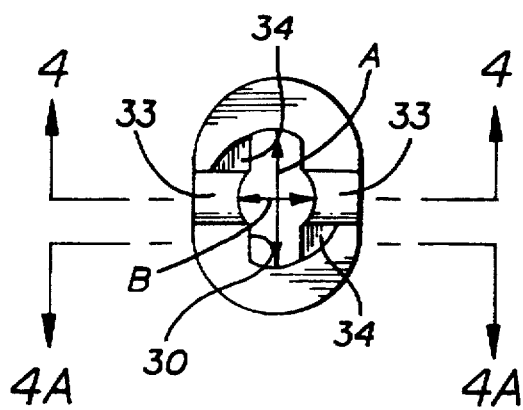
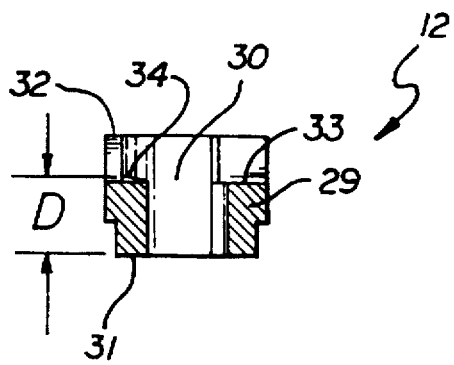
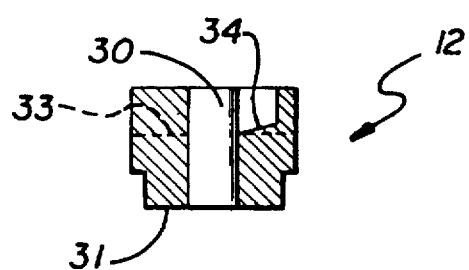
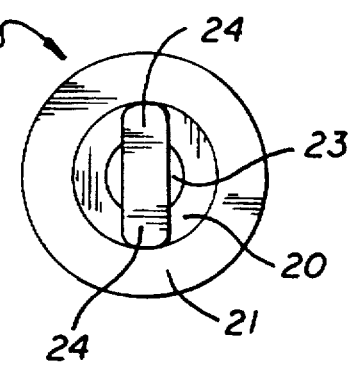
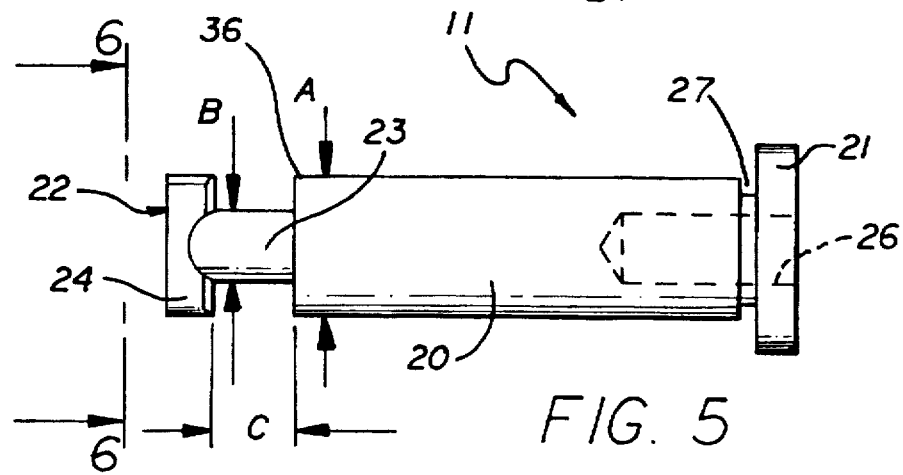

QUICK RELEASE FASTENER

BACKGROUND OF THE INVENTION

This invention relates to a new and improved fastener having quick release capability and to a wheel and axle combination utilizing a quick release fastener. A variety of such fasteners are available today.

A typical fastener has a pin and a retainer, sometimes with some type of spring for maintaining pressure on the components being joined. Also it is often desirable to be able to control the spacing between the components and to maintain this spacing constant, as well as to control the load exerted by the fastener on the components.

Another desirable feature for such a quick release fastener is to have the capability of using the pin as an axle for supporting rotating components such as a wheel, with or without bearings.

A problem with conventional screw and nut fasteners is that it is easy to over torque the assembly. Over torquing is a problem when the screw is used as an axle with the compression force resulting from excess torque limiting the free rotation of the wheel on the axle.

In contrast, a quick release fastener operates with a fixed distance and the torque is designed into the fastener. Over torque is eliminated.

Accordingly, it is an object of the present invention to provide a new and improved quick release fastener which will achieve these desirable ends. The invention also comprises novel details of construction and novel combinations and arrangements of parts, together with other objects, advantages, features and results, which will more full appear in the course of the following description.

SUMMARY OF THE INVENTION

The quick release fastener of the invention includes a pin and a retainer, with the pin having a shaft with a head at one end of the shaft, and having a stem terminating in a cross bar at the other end of the shaft, with the stem of lesser diameter than the shaft, and with the retainer having a body with an opening for the other end of the pin. The body of the fastener has an inner end for passing the stem and the cross bar and an outer end with transverse notches for receiving the cross bar, with the body having a ramp adjacent each of the notches.

A more specific form of the invention includes a quick release fastener having a pin and a retainer, with the pin having a shaft of a diameter A with a head at one end of the shaft, and having a T-shaped tip at the other end of the shaft, with the T-shaped tip having a stem in line with the shaft and opposed transverse arms, with the stem of the tip of a diameter B less than the diameter A, and with the distance across the transverse arms greater than the diameter B, and with the stem of a length C. The retainer has a body with an opening for the tip of the pin, and the body has an inner end for passing the tip of the pin and an outer end with transverse notches for receiving the arms of the tip, with the body having a ramp adjacent each of the notches, with the length D of the body between the inner end and the ramp not greater than the length C.

The fastener may include a spring washer on the shaft between the head of the pin and the inner end of the retainer, and with the transverse arms of the tip having convex inner sides, and with the head of the pin having a non-round tool engaging surface.

The fastener of the invention may be used in combination with a wheel, with the fastener pin serving as the axle for the wheel.

BRIEF DESCRIPTION OF THE DRAWINGS

FIG. 3 is an outer end view of the retainer of the fastener of FIG. 1;

FIGS. 4 and 4A are sectional views taken along the lines 4—4 and 4A—4A, respectively, of FIG. 3;

FIG. 5 is a side view of the pin of the fastener of FIG. 1;

FIG. 6 is an end view taken along the line 6—6 of FIG. 5;

DESCRIPTION OF THE PREFERRED EMBODIMENTS

Figure 1:
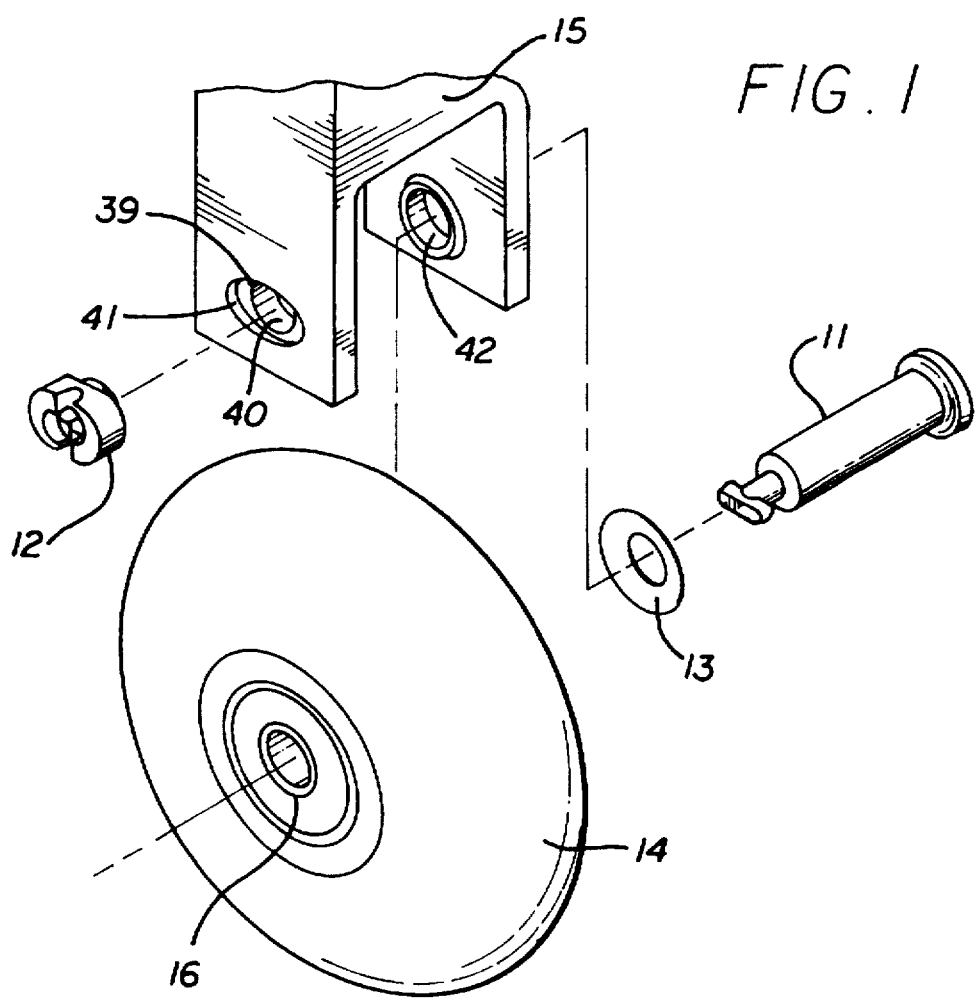
FIG. 1 is an exploded view of a quick release fastener incorporating the features of the present invention and used as an axle for a wheel.
Figure 2:
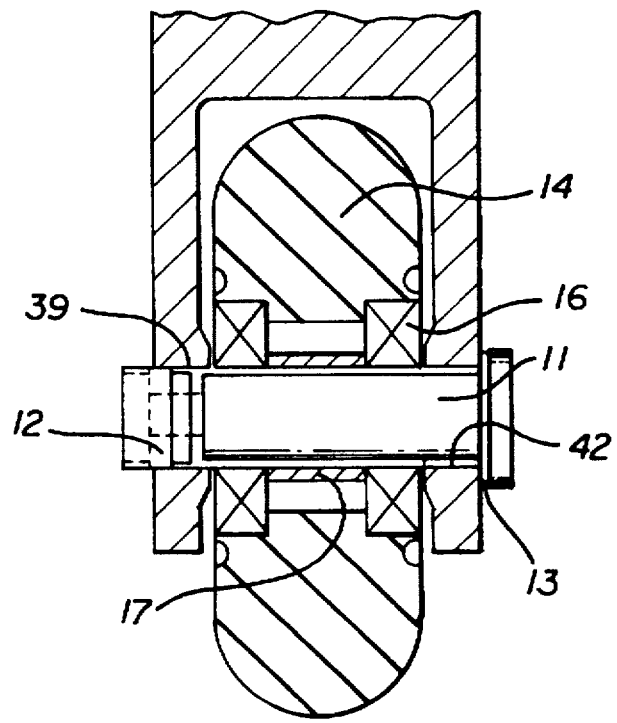
FIG. 2 is a vertical sectional view through the fastener and wheel of FIG. 1 showing the fastener in place and serving as an axle for the wheel.

Referring to FIGS. 1 and 2, the fastener includes a pin 11, a retainer 12 for the pin, and a spring washer 13, sometimes known as a Bellevile washer. In an alternative construction, the washer 13 may be made of rubber or neoprene or other compressible material. A plain flat washer may be used between the spring washer and the head of the pin, if desired. A wheel 14 is carried by the fastener in a fork 15. Typically the wheel is mounted on two bearings 16 separated by a sleeve 17. In this construction, the fastener serves as an axle for the wheel.

Turning to FIGS. 3–6, the pin 11 has a shaft 20 with a head 21 and a tip 22. The tip is T-shaped with a stem 23 and transverse arms or cross bar 24. The inner faces of the cross bar preferably are convex.

The stem 23 is of a lesser diameter than the shaft 20, and in the embodiment illustrated, the shaft has a diameter A and the stem has a diameter B which is less than the diameter A.

The head 21 of the pin desirably has some non-round characteristic for engaging a tool. The head itself may be square or hexagonal or have a slot. Alternatively, an opening 26 may be provided in the head and, if desired, extending into the shaft, with the opening being non-round, such as square or hexagonal. Typically, the distance across the arms 24 is the same as the diameter of the shaft, as seen in FIG. 6. A groove 27 may be provided in the shaft 20 adjacent the head 21 to serve as a retainer for the washer 13. When a rubber washer is used, it may be designed as a push fit on the shaft and the groove will be superfluous. A chamfer may be provided at the end 36 of the pin for ease of installation.

The retainer 12 has a body 29 with an opening 30 therethrough between an inner end 31 and an outer end 32. The inner end 31 may be stepped or have other shapes, for insertion into a member to be connected by the fastener. The opening 30 of the retainer is shaped to receive the tip 22 of the pin, and typically has a diameter corresponding to the diameter 23 of the stem, shown as B, as well as extended opposing grooves for receiving the transverse arms 24 of the pin, shown here with the dimension A.

Transverse notches 33 are provided in the outer end of the retainer for receiving the transverse arms 24 of the pin. Preferably the notches are concave for better engagement with the convex cross bars of the pin. Also, preferably ramps 34 are provided in the outer end of the retainer for engagement by the transverse arms during installation. Preferably, the inner sides 35 of the arms are convex, as best seen in FIG. 5. Also, the distance between the inner end 31 of the retainer and the ramp 34, indicated as D in FIG. 4, should be not greater than the length of the stem 23, indicated as C in FIG. 5. This arrangement permits the transverse arms to pass over the ramps when the end 36 of the shaft 20 of the pin abuts the inner end 31 of the retainer. The fastener may be made bidirectional by providing two sets of the ramps 34. The head 21 and the outer end of the top 22 of the pin and the outer end 32 of the retainer are shown as flat, but may be rounded or dome shape if desired.

In the installation shown in FIGS. 1 and 2, the inner end 29 of the retainer is reduced as shown in FIG. 4 and an opening 39 in the fork 15 has a round inner portion 40 and a non-round outer portion 41. The retainer is positioned in the opening 39, and may be fixed in place by staking or braising or otherwise as desired. The wheel 14 is assembled in the fork 15 by positioning the wheel between the arms of the fork and then sliding the pin 11 with the spring washer 13 thereon through the opening 42, through the bearings 16 and spacer 17 and into the retainer. A push force is applied to the pin to compress the washer 13 and a torque is applied to the pin to rotate the transverse arms over the ramps 34 into the notches 33. The compression force produced by the fastener is controlled by the compressed spring. The spacing between the arms of the fork can be controlled by abutment of the end 36 of the pin against the end 31 of the retainer.

Figures 7, 8, 9:
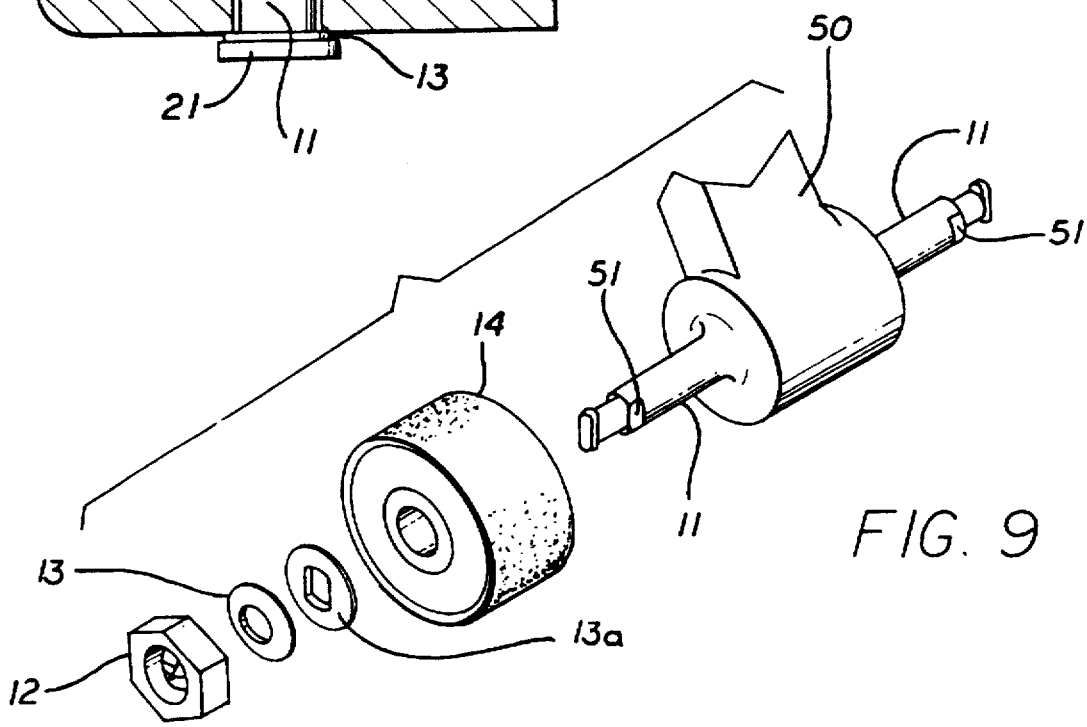
FIG. 7 is a sectional view similar to that of FIG. 2 showing another utilization of the fastener of the invention.
FIG. 8 is a sectional view similar to FIGS. 2 and 7 showing another utilization of the fastener.
FIG. 9 is an exploded view showing the use of the fasteners of the invention in a double axle arrangement.

Another example of an installation of the fastener of the invention is shown in FIG. 7 with the retainer 12 carried in a frame member 45 with a channel 46 and an elastomer foot or skid plate 47. The head 21 of the pin and the spring washer 13 are positioned in a recess 48 in the foot 47, with the retainer 12 positioned in the frame member 45.

Another example of use of the fastener of the invention is shown in FIG. 8, with a sheet 41 of glass or wood or the like carried in a channel 42, with the channel attached to a support frame 43 by the fastener. If desired, a knurl can be used on the end 31 of the retainer for fixing of the retainer in the frame. Also, if desired, the retainer could be formed integrally in the frame 43 or in the frame member 45.

An embodiment using two of the quick release fasteners for a pair of wheels is shown in FIG. 9. Two pins 11 are formed in line with each other and integral with a support arm 50. Flat surfaces 51 may be provided on the pin if desired, and a washer 13A with a mating opening may be placed on the pin 11 between the wheel 14 and the washer 13. The retainer 12 will have a shape for engagement by a tool for rotating the retainer 12 to engage the pin and release the retainer from the pin. Typically the external shape is hexagonal.

An advantage of having a quick release fastener is for quick replacement of wear items, such as skid plates, wheels, rubber isolators, and glass and wood components. The fastener may also be used on display casings where it would be helpful for quick assembly or disassembly of display panels and shelves. The spring washer will compensate for dimensional variations. This is an important feature when used to control the fastener load applied to brittle or delicate panels, such as glass or soft materials that might break or crush when a screw or bolt is tightened.

I claim:

1. A quick release fastener having a pin and a retainer,
    said pin having a shaft with a head at one end of said shaft, and having a stem terminating in a cross bar at the other end of said shaft, with said stem of lesser diameter than said shaft,
    said retainer having a body with an opening for said other end of said pin,
    said body having an inner end for passing said stem and said cross bar and an outer end with transverse notches for receiving said cross bar,
    said body having a ramp adjacent each of said notches.

2. A quick release fastener having a pin and a retainer,
    said pin having a shaft of a diameter A with a head at one end of said shaft, and having a T-shaped tip at the other end of said shaft,
    said T-shaped tip having a stem in line with said shaft and opposed transverse arms,
    with said stem of said tip of a diameter B less than said diameter A, and with the distance across said transverse arms greater than said diameter B, and with said stem of length C,
    said retainer having a body with an opening for said tip of said pin,
    said body having an inner end for passing said tip of said pin and an outer end with transverse notches for receiving said arms of said tip,
    said body having a ramp adjacent each of said notches, with the length D of said body between said inner end and said ramp not greater than said length C.

3. A fastener as defined in claim 2 including a spring washer on said shaft between said head of said pin and said inner end of said retainer.

4. A fastener as defined in claim 3 wherein said transverse arms of said tip have convex inner sides.

5. A fastener as defined in claim 4 wherein said head of said pin has a non-round tool engaging surface.

6. An axle for a wheel having a central opening, including a quick release fastener having a pin and a retainer,
    said pin having a shaft for positioning in said central opening of said wheel, said pin having a head at one end of said shaft, and having a stem terminating in a cross bar at the other end of said shaft, with said stem of lesser diameter than said shaft,
    said retainer having a body with an opening for said other end of said pin,
    said body having an inner end for passing said stem and said cross bar and an outer end with transverse notches for receiving said cross bar,
    said body having a ramp adjacent each of said notches.

7. An axle for a wheel having a central opening, including a quick release fastener having a pin and a retainer,
    said pin having a shaft of a diameter A for positioning in said central opening of said wheel, said pin having a head at one end of said shaft, and having a T-shaped tip at the other end of said shaft,
    said T-shaped tip having a stem in line with said shaft and opposed transverse arms,
    with said stem of said tip of a diameter B less than said diameter A, and with the distance across said transverse arms greater than said diameter B, and with said stem of a length C,
    said retainer having a body with an opening for said tip of said pin, said body having an inner end for passing said tip of said pin and an outer end with transverse notches for receiving said arms of said tip, said body having a ramp adjacent each of said notches, with the length D of said body between said inner end and said ramp not greater than said length C.

8. An axle and wheel combination, said wheel having a central opening for said axle, said axle including a quick release fastener having a pin and a retainer, said pin having a shaft for positioning in said central opening of said wheel, said pin having a head at one end of said shaft, and having a stem terminating in a cross bar at the other end of said shaft, with said stem of lesser diameter than said shaft, said retainer having a body with an opening for said other end of said pin, said body having an inner end for passing said stem and said cross bar and an outer end with transverse notches for receiving said cross bar, said body having a ramp adjacent each of said notches.

9. A double axle for a pair of wheels each having a central opening, including:

a pair of quick release fasteners, each having a pin and a retainer;

each of said pins having a shaft for positioning in the central opening of one of the wheels, said pins having heads at one end terminating in a support arm with said pins in axial alignment, each of said pins having a stem terminating in a cross bar at the other end of said shaft, with said stem of lesser diameter than said shaft, each of said retainers having a body with an opening for said other end of said pin, said body having an inner end for passing said stem and said cross bar and an outer end with transverse notches for receiving said cross bar, said body having a ramp adjacent each of said notches.

10. A double axle for a pair of wheels each having a central opening, including a quick release fasteners, each having a pin and a retainer, each of said pins having a shaft of a diameter A for positioning in the central opening of the wheels, said pins having heads at one end terminating in a support arm with said pins in axial alignment, each of said pins having a T-shaped tip t the other end of said shaft, said T-shaped tip having a stem in line with said shaft and opposed transverse arms, with said stem of said tip of a diameter B less than said diameter A, and with the distance across said transverse arms greater than said diameter B, and with said stem of a length C, each of said retainers having a body with an opening for said tip of said pin, said body having an inner end for passing said tip of said pin and an outer end with transverse notches for receiving said arms of said tip, said body having a ramp adjacent each of said notches, with the length D of said body between said inner end and said ramp not greater than said length C.

* * * * *